M. H. SPIELMAN.
SAFETY DEVICE FOR ELECTRICAL CIRCUITS.
APPLICATION FILED MAR. 23, 1916.
1,240,896.
Patented Sept. 25, 1917.
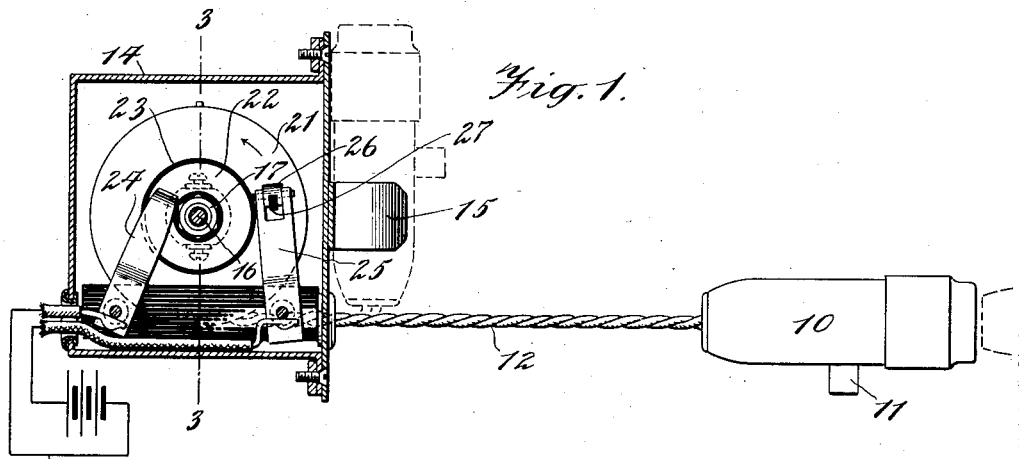
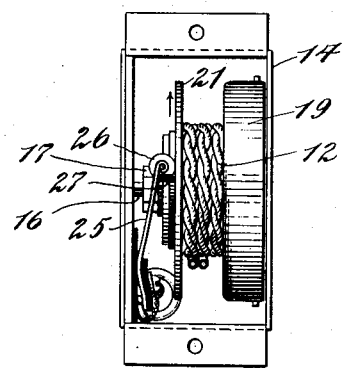
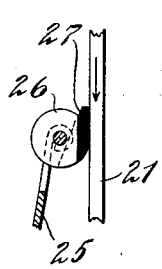
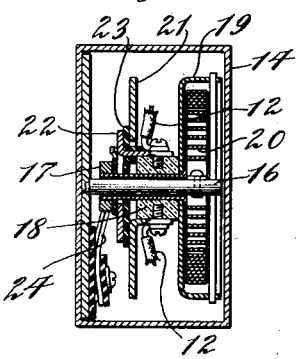
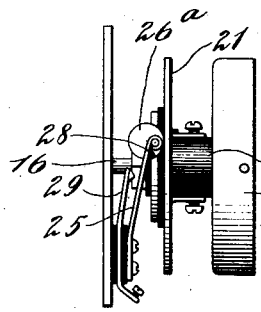
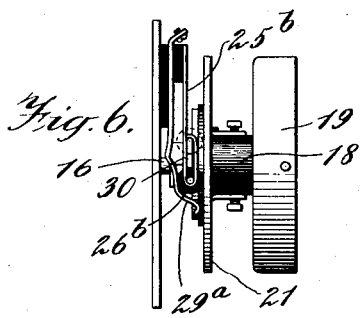
Maximillian H. Spielman, Inventor
By his Attorney
Isaac B. Owens

UNITED STATES PATENT OFFICE.

MAXIMILLIAN H. SPIELMAN, OF NEW YORK, N. Y.

SAFETY DEVICE FOR ELECTRICAL CIRCUITS.

1,240,896. Specification of Letters Patent. Patented Sept. 25, 1917.

Application filed March 23, 1916. Serial No. 86,079.

*To all whom it may concern:*

Be it known that I, MAXIMILLIAN H. SPIELMAN, a citizen of the United States, and a resident of the borough of Manhattan, in the city, county, and State of New York, have invented certain new and useful Improvements in Safety Devices for Electrical Circuits, of which the following is a description in such full, clear, and exact terms as will enable any person skilled in the art to which it pertains to make and use the same.

My invention relates to those electrical devices which have a flexible cord metallic conductor to supply the current and especially to those in which the cord runs in and out from a reel or other device on which it is wound when not in use as shown, for example, in my prior Patent No. 1,147,277 dated July 20, 1915.

The object of the invention is to prevent short circuits and the dangers resulting therefrom due to the wearing away of the insulation in the flexible conductor cord or cable and in attaining this end I provide a peculiar circuit breaker which is operative when the cord has a return or winding movement so that after the device is used and the cord is allowed to return on the reel the current is cut off from the cord and there is no danger of short circuiting the same.

The invention is useful in various connections but notably in connection with the electrical cigar lighter shown in my previous patent and the drawings illustrate the invention in that situation.

Referring to these drawings,

Figure 1 is a sectional elevation.

Fig. 2 is an end elevation and the reel showing the circuit breaker and the connected parts.

Fig. 3 is a cross-section on the line 3—3 of Fig. 1.

Fig. 4 is a detailed view of the circuit breaker.

Fig. 5 is an elevational view of a modification, and

Fig. 6 is an elevational view of the second modification.

Referring to Figs. 1 to 4, 10 is the cigar lighter shown in my prior patent above referred to and 11 the thumb switch thereof which closes the circuit to make the lighter operative. 12 is the electrical conductor cable which leads the current to the cigar lighter 10.

A suitable housing 14 is provided which is let into the supporting part or otherwise fastened to it and which may be provided with a holder 15 (Fig. 1) on its outside to carry the lighter.

Within the housing 14 is a reel on which the cable 12 is wound. The structure of this reel is best shown in Fig. 3. 16 is an arbor on which the hub 17 of the reel is mounted loosely. This reel has an insulation mass 18 surrounding the hub to which the terminals of the cable 12 are fastened. On one side of the insulation mass 18 a case 19 is provided for a spiral spring 20 which is fastened to the case and to the arbor 16. At the other side of the insulation mass 18 a flange 21 is fastened so that between the insulation mass or hub 18 the case 19 and the flange 21 a reel is formed and on this reel the cable 12 is adapted to wind and unwind.

One of the terminals of this cable is in electrical connection with the flange 21 as shown at the lower part of Fig. 3 and the other terminal is in connection with a metal disk 22 which is fastened on the reel insulated from it as indicated at 23 in the drawings.

24 indicates a brush or contact finger which runs on the disk 22 and is mounted by insulation on the case 14 within the same. A spring arm 25 is also mounted by insulation within the case and this arm and the finger 24 are connected to the terminals of an electrical circuit 26 which furnishes the current for operating the cigar lighter 10 or other electrical device in connection with which the invention may be used.

The current passes from the arm 25 to the disk 21 of the reel through the medium of a peculiar circuit breaking device which is carried on the free end of the arm. This device is best shown in Fig. 4 and comprises a roller 26 mounted to turn on the arm and to run on the side of the disk. This roller has an insulation segment 27 eccentrically disposed so that when the disk 21 runs against the insulation segment in the direction shown by the arrow in Fig. 4, the roller 26 does not revolve but the disk 21 simply slides against the segment. However, if the disk 21 reverses its direction of motion then the roller 26 will revolve on the disk and the insulation segment 27 will move away from contact with the disk bringing the metal part of the roller into contact with the disk. In the first position, i. e. that shown in Fig. 4 the insulation segment 27 will prevent the movement of the current from the arm 25 to the disk 21. Upon the reversal or second described motion the roller 26 will be moved around into contact with the disk thus completing the electrical circuit between the arm 25 and the disk 21.

Now it will be noted that the parts are so arranged that as the cigar lighter or other device connected to the cable 12 is moved out and the cable unwinds from the reel then the reel will be turning in the direction opposite to that indicated by the arrow in Fig. 4 so that the roller 26 contacts with the disk 21 and the circuit of the cigar lighter device 10 is closed so that the lighting device is operative. When the operator releases the igniting device 10 and the spring 20 causes the cable to be rewound on the reel the direction of rotation of the reel and disk 21 is reversed i. e. the disk moves in the direction indicated by the arrow in Fig. 4 and then the insulation segment rolls into contact with the disk and owing to the eccentric form of this segment it stays in contact thereby breaking the circuit upon the return motion of the reel and keeping it broken.

The result is that when the operator pulls out the cigar lighter to use it the current is closed and the instant he releases the cigar lighter and allows it to move back the circuit is automatically opened so that no short-circuit can occur in the cable 12 and there is no danger of fire or any other such disastrous results. The end switch 11 may or may not be employed. It is however, thought to be convenient to use it and its presence operative as an additional precaution.

The modification shown in Fig. 5 consists simply in an eccentric roller 26ª which runs against the disk 21. This roller is carried on the arm 25 and has a stop pin 28 which causes it to occupy the position shown in Fig. 5. When the eccentric reverses itself it causes the arm 25 to move back into contact with an arm 29 thus completing the circuit. In the position shown in Fig. 5 the circuit is broken.

Fig. 6 shows a third form of the invention in which the arm 25ᵇ has a guide way 30 therein and the roller 26ᵇ has an insulation roller the journal of which plays freely in the guide way 30. 29ª is the other contact arm. This arm 29ª is designed to contact with the disk 21. Now when the disk 21 is running to unwind the cable, insulation roller 26ᵇ moves back toward the fixed end of the arm 25ᵇ and the arm 29ª is thereby permitted to contact with the disk 21 but when the motion of the reel is reversed to rewind the cable the roll 26ᵇ assumes a position shown in Fig. 6 which moves the arm 29ª out of engagement with the disk 21 and breaks the circuit.

Various other modifications of the invention may be resorted to as will be obvious to skilled mechanics and without departing from the principle of my invention herein set forth.

Having thus described my invention what I claim is new and desire to secure by Letters Patent of the United States is:—

1. The combination with an electrical device and a flexible two-part conductor cable to supply the current thereto, of a reel over which the cable is adapted to wind, a spring for rewinding the cable on the reel, the reel having two annular conducting surfaces insulated from each other and respectively connected electrically to the parts of the conductor cable, a contact joining one of said conducting surfaces to the source of current, a spring contact arm in the circuit and adapted to join the other conducting surface with the source of current and a back and forth rotating member running on the second conducting surface and rotated by the rotation of the reel, said member coacting with the spring contact arm to make and break the circuit according to the direction of rotation of the reel.

2. The combination with an electrical device and a flexible two-part conductor cable to supply the current thereto, of a reel over which the cable is adapted to wind, a spring for rewinding the cable on the reel, the reel having two annular conducting surfaces insulated from each other and respectively connected electrically to the parts of the conductor cable, a contact joining one of said conducting surfaces to the source of current, a spring contact arm in the circuit and adapted to join the other conducting surface with the source of current and a back and forth rotating member running on the second conducting surface and rotated by the rotation of the reel, said member coacting with the spring contact arm to make and break the circuit according to the direction of rotation of the reel, said back and forth rotating member being journaled on and carried by the spring contact arm.

3. The combination with an electrical device and a flexible two-part conductor cable to supply the current thereto, of a reel over which the cable is adapted to wind, a spring for rewinding the cable on the reel, the reel having two annular conducting surfaces insulated from each other and respectively connected electrically to the parts of the conductor cable, a contact joining one of said conducting surfaces to the source of current, a spring contact arm in the circuit and adapted to join the other conducting surface with the source of current and a back and forth rotating member running on the second conducting surface and rotated by the rotation of the reel, said member coacting with the spring contact arm to make and break the circuit according to the direction of rotation of the reel, said back and forth rotating member being journaled on and carried by the spring contact arm and having an eccentrically located insulation segment set into its surface, for the purpose specified.

In testimony whereof I have hereunto signed my name in the presence of two witnesses.

MAXIMILLIAN H. SPIELMAN.

Witnesses:
 ISAAC B. OWENS,
 ETHEL S. HUGHES.